United States Patent Office 3,375,584
Patented Apr. 2, 1968

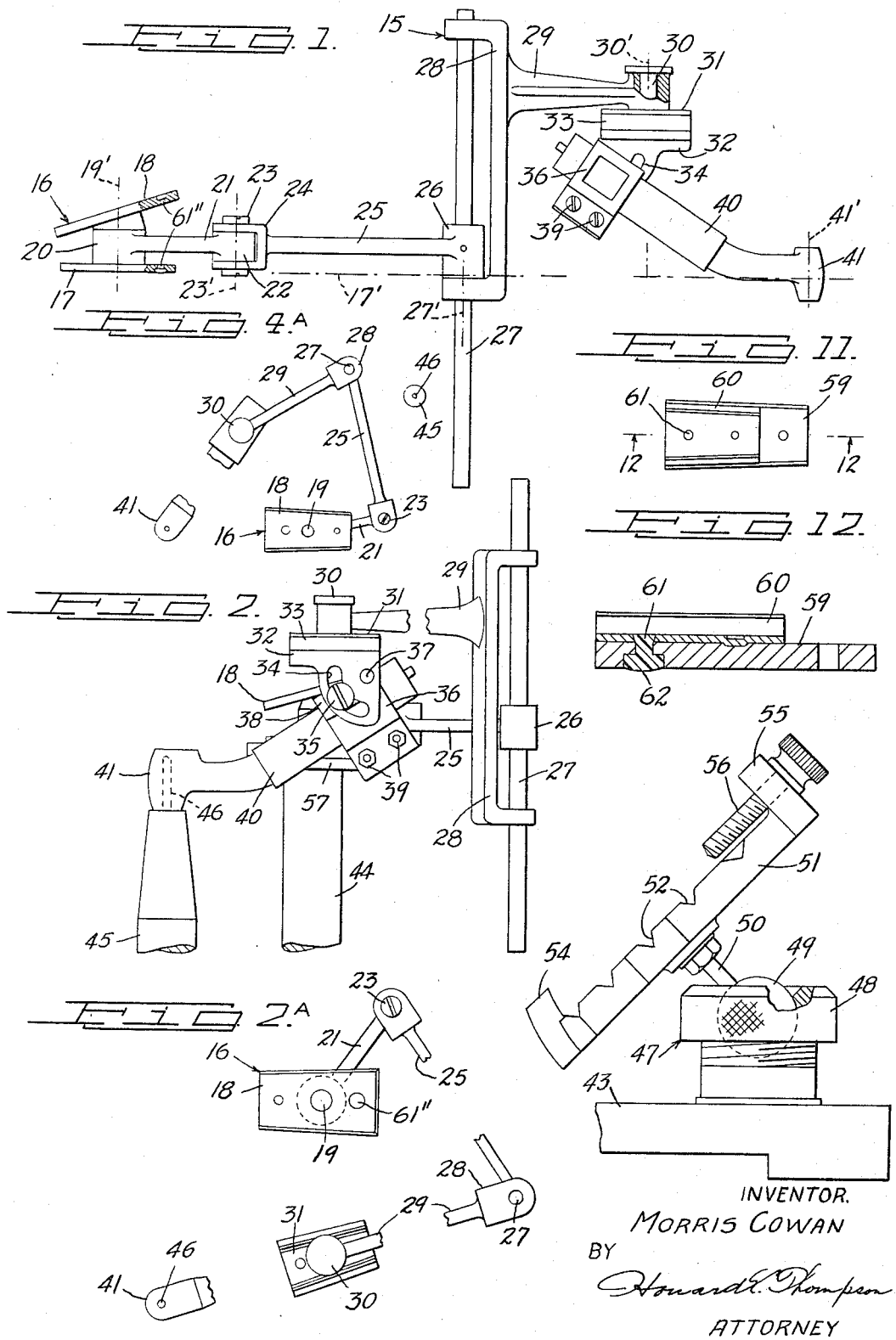

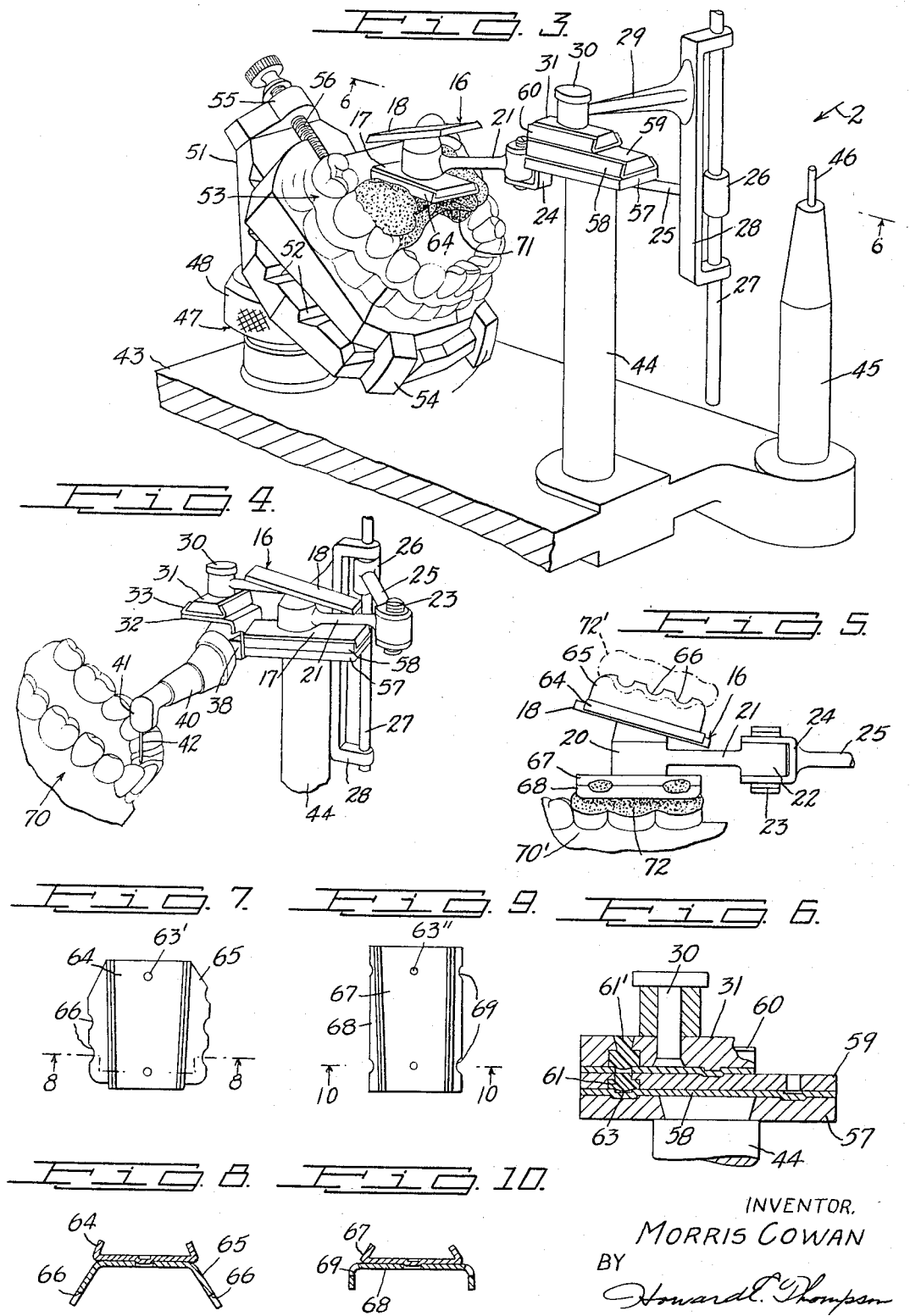

3,375,584
INSTRUMENT FOR PROVIDING PARALLEL
PIN DENTURE ANCHORAGE
Morris Cowan, 320 Central Park W.,
New York, N.Y. 10025
Filed Nov. 29, 1965, Ser. No. 510,304
10 Claims. (Cl. 32—67)

In restorative dentistry, pin anchorage is often used when fixed bridges or splints are suggested. This invention relates to an instrument which provides both the method and means of accurately drilling a series of parallel holes in the teeth for reception of restorative casts containing pins corresponding in size, number, location and parallelism to the prepared holes in the teeth. Another and equally important use of the invention is that it provides a method and means for preparing abutment teeth in parallel. Thus, a restorative cast in any metal containing either abutment crowns only, pins only, or pins and crowns can be made to accurately match the prepared teeth. Further, the invention deals with a method including what might be generally referred to as instruments for first conducting a survey on a stone or other cast of teeth of a mouth and, then, in utilizing part of the instruments to then proceed to drilling holes in teeth in the mouth, consistent with the pre-survey that had been made.

Still more particularly, the invention deals in the use of instruments, wherein means is provided for accurately alining a transit assemblage, including the contra-angle or tool holder in setting the drill support head or chuck of said holder in parallelism with the primary pivot post of the transit assemblage.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a side view of a transit assemblage showing a contra-angle or tool holder coupled therewith, with the parts in extended or alined position and with parts of the construction broken away and in section.

FIG. 2 is a diagrammatic side view of the structure shown in FIG. 3, looking generally in the direction of the arrow 2 of FIG. 3 and showing parts of the transit assemblage, including the tool holder, in different position, and, further, omitting showing of any stone cast on the platform of the base.

FIG. 2A is a diagrammatic broken plan view primarily to show arrangement of the several pivots in the relationship diagrammatically illustrated in FIG. 2 of the drawing.

FIG. 3 is a diagrammatic isometric view of the major portion of the instrument illustrating the bilateral setup showing the transit assemblage in one of its possible arrangements.

FIG. 4 is a diagrammatic isometric view illustrating the assemblage as shown in FIG. 1 in supported position on the column of the base in performing a survey.

FIG. 4A is a diagrammatic plan view to illustrate arrangement of the several pivots, as diagrammatically illustrated in FIG. 4 of the drawing on a reduced scale.

FIG. 5 is a side view of the lower teeth of the mouth or a stone cast of such teeth, illustrating a lateral setup, part only of the transit assemblage being shown and illustrating, in dot-dash lines, the molded body for engagement with upper teeth of a mouth when the assemblage is so used.

FIG. 6 is an enlarged sectional detail view on the line 6—6 of FIG. 3, with parts of the construction shown in elevation.

FIG. 7 is a plan view of one form of transfer tray.

FIG. 8 is a section on the line 8—8 of FIG. 7 on an enlarged scale and omitting background showing.

FIGS. 9 and 10 are views, similar to FIGS. 7 and 8, of a modified form of tray, the section FIG. 10 being on the line 10—10 of FIG. 9.

FIG. 11 is a plan view of an adaptor plate and socket; and

FIG. 12 is an enlarged section on the line 12—12 of FIG. 11.

Considering FIG. 1 of the drawing, the instruments for carrying out or performing the method comprises what I term a transit assemblage 15, comprising a carrier 16, the carrier having a bevelled edge coupling or carrier plate 17 and an angularly disposed bevelled edge top coupling plate 18, both having pivotal mounting on axis 19, note FIG. 2A mounted on one bearing end 20 of a link 21, the axis of 19 being diagrammatically shown by the dot-dash line 19' in FIG. 1.

The other bearing end 22 of the link 21 supports a pivot pin 23, the axis line of which is shown by the dot-dash line 23' and mounted on this pin is the forked end 24 of an arm 25, the bearing end 26 of said arm being fixed to a first or main pivot post or pin 27 of the assemblage, the axis of 27 being illustrated by the dot-dash line 27'.

The pin 27 is slidably and rotatably mounted in a widespread yoke-shaped bearing 28, having an integral radially extending arm 29, in the free bearing end of which is supported a pivot pin 30, the axis of which is illustrated by the dot-dash lines 30'. Mounted on the pin is a secondary bevelled edge coupling plate 31 which is at all times in parallel relationship to the plate 17.

The structure just described is a constantly united part of the assemblage. However, for purposes of simplified illustration, the contra-angle or tool holder and its supporting and mounting means have been shown attached with the plate 31. This attachment and mounting comprises an L-shaped clamp supporting bracket 32, note FIG. 4, to the upper end of which is fixed a dovetailed socket 33, in which the plate 31 is coupled. At this time, it is pointed out that all of the plates 17, 18 and 31 are naturally dovetailed in form for engagement with the several sockets. The depending wall of the bracket 32 has an arc-shaped aperture 34, in which a setscrew 35, coupled with a clamp 36, operates in adjustably fixing the clamp with respect to the bracket 32. The clamp 36 has a pivotal mounting, as at 37, to the clamp, as diagrammatically illustrated in FIG. 2 of the drawing. The clamp 36 includes a block 38 at one side thereof for reception of the setscrew 35 and pivot 37, this block being seen in FIG. 2 of the drawing. The projecting plates at the open end of the round clamp 36 are secured together by bolt and nut fasteners, as seen at 39 in FIGS. 1 and 2 of the drawing, in securely fixing the contra-angle or tool holder 40 in the adjusted position in the clamp both longitudinally of the axis of 40 or rotary with respect to said axis in proper alinement and positioning of the head or chuck 41 of 40. This adjustment is primarily to set the axis 41' of the chuck parallel with respect to the other axes, as later described. In actual practice, the holder 40 has a milled or other roughened surface and, quite often, a split bushing is disposed within the clamp 36 in securely retaining the holder 40 in an adjusted position, both not shown.

The above description now completes the transit assemblage, including attachment of the holder 40 therewith, with the exception of support of a drill or other type of tool 42 in the chuck head 41, as diagrammatically seen in FIG. 4 of the drawing.

Turning now to the consideration of FIGS. 2, 3 and 6 of the drawing, the other portion of the instrument for carrying out the method comprises a base 43, having an upstanding column 44, an upstanding gauge pin holder 45, including a gauge pin 46 at its upper end and a universal socket 47, including a milled nut 48 engaging a ball 49, note FIG. 2, the ball having a projecting rod 50, to which a platform 51 is suitably coupled. The platform 51 has, at its upper surface, transverse and longitudinal grooves 52 for secure positioning of a stone or other cast 53. The lower end of the platform has two curved gripper fingers 54, note FIG. 3, engaging the lower portion of the cast, wherein the upper end of the platform, as viewed in FIGS. 2 and 3, has a raised bearing 55 supporting an adjustable setscrew 56 securely retaining the cast 53 upon the platform. The universal mounting of the platform facilitates positioning the cast 53 in any desired vertical plane or angular position, in other words, tilting the platform from side to side to enable the dentist to perform the desirable survey, consistent with any type and kind of condition which may prevail. The tightening of the nut 48 will retain the platform and the cast 53 supported thereon in any desired adjusted position.

The upper end of the column 44 has a fixed transverse plate 57, supporting on its upper surface a dovetailed socket 58, the plate and socket being parallel to the plates 17 and 31 and at right angles to the first axis 27′, the second axis 30′, the third axis 19′ and the fourth axis 23′, as well as the axis 41′ of the drill or other tool mounted in the chuck head 41. All of these parallel axes are at right angles to the plane of the primary plate 17, as indicated by the dot-dash line 17′.

Considering FIGS. 6, 11 and 12 of the drawing, here is disclosed an adaptor mounting, comprising a dovetailed bevelled edge plate 59, to the upper surface of which is suitably fixed a dovetailed socket 60, preferably shorter in length than the length of the plate 59. The length of the plate 59 is such as to fit the socket 58 on the top of the column, as seen in FIGS. 3 and 6 of the drawing. On the other hand, the socket 60 is of sufficient length to receive the plate 31, as clearly noted in FIGS. 3 and 6 of the drawing.

All of the plates 17, 18, 31 and 59 include, at the wide end portions thereof, plastic plugs, for example, the plug 61 shown in the plate 59 in FIGS. 6 and 12, having a slightly rounded projection 62 on the surface thereof to engage a depression or recess 63 formed in the upper surface of, for example, the socket 58, as diagrammatically seen in FIG. 6 of the drawing, to frictionally retain the plate 59 in coupled relationship with the socket 58. A sample coupling engagement is provided between the plate 31 and the socket engaged thereby, as shown, for example, at 61′ in FIG. 6, it being understood that 61′ also has a similar coupling engagement with the socket 33 when 31 is mounted in said socket 33, as shown in FIGS. 1 and 2 of the drawing. For this reason, no further detailed showing of this structure is thought to be necessary, as it will be well understood to those skilled in the art. This frictional engagement is simply to retain the coupled parts against accidental displacement, but the parts can be uncoupled by simply applying pressure on the contracted ends of the several plates. Similar plastic couplings are provided, as at 61″ in the plates 17 and 18, note FIG. 1, for engagement with depression 63 when the plate 17 is mounted in the post socket 58, or to engage similar depressions 63′ and 63″ formed in wide end portions of transfer trays shown in FIGS. 7 to 10, inclusive. The transfer tray, shown in FIGS. 7 and 8 of the drawing, comprises a top dovetailed socket 64, generally similar to the socket 58, and suitably secured to the lower surface of the socket is a diverging channel plate 65, side edges of which have spaced notches 66 for anchorage of suitable moldable materials thereto, as later described.

The tray, as shown in FIGS. 9 and 10 of the drawing, has an upper channelled socket 67, generally similar to the socket 64, and to the lower surface of the socket 67 is suitably secured a channelled plate 68 having, on side wall portions thereof, spaced apertures 69, again, for anchorage of moldable material thereon, as later described.

The first step in setting the instrument or what might be termed the apparatus, the assemblage, as seen in FIGS. 1 and 2 of the drawing, is first generally made, whereupon, the plate 17 is coupled with the socket 58 at the upper end of the column 44 and, then, with the setscrew 35 loosened, as well as the fastening devices 39, the contra-angle or tool holder is adjusted in the clamp 36 as to length and rotation to fit the chuck head 41 on the pin 46 by suitable manipulation of the assemblage 15 and, when the parts have been properly assembled, the setscrew 35, as well as the fasteners 39, are secured in position. Then this complete assemblage is now ready for use in conducting a survey, as diagrammatically illustrated, in part, in FIG. 4 of the drawing. In order to clearly illustrate the arrangement of the parts, as seen in FIG. 2, FIG. 2A has been added, primarily to show the various pivots 19, 23, 27, 30, as well as the drill or tool socket of the head 41, the axis 41′ of which is diagrammatically shown. The other components of the complete assemblage are only diagrammatically outlined in FIG. 2A.

FIG. 4A of the drawing is a view, similar to FIG. 2A, but showing the various positions of the parts of the assemblage and their pivots, similar to the diagrammatic showing of FIG. 4 of the drawing, to clearly visualize the general arrangement of the parts and, in FIG. 4A, the pin 46 of the post 45 has been shown. In this connection, it will be apparent, from a consideration of FIG. 4 of the drawing, that, at 70 is diagrammatically illustrated, in part, teeth of the lower jaw in making a survey or could represent a stone cast of the teeth, as at 53 in FIG. 3. In this event, the contra-angle will be supported on the plate 31, as seen in FIGS. 1 and 4. It must be understood that, at this time, the assemblage carrier 16 is supported, as seen in FIG. 3 of the drawing. Also in the drilling of the teeth of the lower jaw 70, FIG. 4, for locating the pin holes, the assemblage carrier 16, as shown in FIG. 3, including the supporting mold 71 on the tray having the socket 64, will be positively positioned and retained on the teeth of the jaw 70.

The mold 71 is of commonly used materials, such, for example, as self-cure acrylic. In other words, when the teeth of 70 are drilled, the entire assemblage of FIG. 1 is supported on the teeth of the jaw 70. However, since the contra-angle is in the operator's hand when in use, the bulk of the weight is borne by the hand.

In FIG. 5, a supporting mold 72 mounted on channel plate 68 of socket 67 is shown supported on teeth of a jaw 70′. In this figure is also shown a socket 64 coupled with the plate 18 of the assemblage carrier 16. On the channel 65, I have indicated, in dot-dash lines 72′, another mold, similar to 72, but adapted to fit or engage teeth of an upper jaw.

With respect to the uses, as diagrammatically shown in FIGS. 3 and 5 of the drawing and in the reference to FIG. 4, it will be understood that the molds 71, 72, 72′ are freely detachable with respect to the assemblage carrier 16, so that the complete operation by the dentist can be conducted over several treatment periods from time to time, the dentist having means to suitably store the mold and tray assemblages identifying the particular patient associated therewith. From this standpoint, it will be apparent that numerous trays, such as shown in FIGS. 7 to 10, inclusive, will be used in conjunction with the rest of the instruments and on numerous different patients. In this connection, it will further be understood that the stone or cast of the patient's teeth will also be similarly cared for.

In accordance with my method, a dentist will, first, make, or have made, a positive stone or cast of the teeth in the jaw of the mouth of the patient in the usual way. He then mounts this case, such as 53, on the platform 51 and adjusts the platform to the angular position which he deems best for the drilling of the teeth. Having found this angle, he then locks the platform in said adjusted position.

The dentist then mounts the transit assemblage, as shown in FIG. 1, on the top of the column 44, as seen in FIGS. 2, 2A. The dentist then loosens the fasteners 35, 39 to adjust the contra-angle 40 to the desired length and also to aline the head or chuck 41 on the gauge pin 46, as seen in FIG. 2. The fasteners 35–39 are then secured to retain the assemblage 15 and contra-angle 40 in the operative position, with the axis 41' parallel with axes 27', 30', 19' and 23'. The head of the chuck 41 is then detached from the pin 46 and the parts moved to the position shown in FIGS. 4, 4A (an illustration of one of many positions which can be assumed) for conducting the survey to locate the points to drill holes in the teeth. These holes are utilized for support of a denture, splint or the like.

In FIG. 4, 70 could represent the supported stone cast, as seen in FIG. 3. Now, with a drill or other gauge tool, as at 42, secured in the head 41, the positive cast or stone will be suitably marked to define the spots or points where the holes are to be drilled in the teeth of a patient.

The next step is to mount the assemblage carrier 16 on the stone 53 in the aforesaid adjusted position, in other words, the position shown in FIG. 3. This is accomplished by using one of the transfer trays having the socket 64 and the channel plate 65. A suitable material, such as self-cure acrylic, is placed on the channel of plate 65 and the tray is positioned on the stone 53, as seen in FIG. 3, and pressed to establish proper engagement of the mold 71 on the teeth in the bilateral setup or support, diagrammatically shown. When set and hardened, the mold 71 of this support will correspondingly set on the teeth of the patient's jaw. Thus, the support supplements the column 44 in support of the transit assemblage 15 in the patient's mouth in the properly surveyed position, facilitating the proper drilling of the teeth with holes, the axis of which are all parallel and further in an arrangement which will facilitate attachment and detachment of the removable denture or splint which is formed, as later described.

The same procedure, as noted above, is followed in what can be termed as the lateral setup, diagrammatically illustrated in FIG. 5 of the drawing, the primary difference being that the tray having the socket 67 and channel plate 68 is utilized for support of the mold 72. In this figure, the tray having the socket 64 and channel plate 65 is also shown to support the mold 72' engaging the teeth of the upper jaw in providing a secure bite support of the transit assemblage in the mouth. This same arrangement can be utilized with the bilateral setup of FIG. 3 but I have found that, by providing extending fingerpieces on the mold 71 at sides of the mouth, the patient can aid in retaining the carrier assemblage in position on the jaw, while the drilling operations are performed. No showing of this has been made, but it will be apparent to those skilled in the art.

With the holes in the teeth of the patient, the dentist follows the generally known steps in producing the ultimate resulting denture, splint or the like as follows.

The dentist puts headed Perlon (nylon 6 polymer) pins into these holes drilled in the teeth. He then flows a rubber base material, such as methylacrylate, around and over these pins, as well as the teeth of the jaw. When the rubber base has set, he then removes the entire mold, including the pins and the tray.

This mold is used in the dental laboratory for the making of the desired splint in the required metal. In this operation, several different procedures are followed, but the resulting splint will have projecting therefrom pins which, in number and parallel relationship and the like, will aline with and fit the holes drilled in the teeth of the patient without the necessity of the dentist performing any operations or adjustments on the pin structure. Here, it should be pointed out that the depth of drilling of the holes in the teeth will be very slightly greater than the length of the pins to result in a perfect fit of the splint.

In addition to the drilling of holes, the instrument can be utilized by mounting in the head or chuck 41 of a high speed contra-angle a burr of suitable design for the preparation and paralleling of abutment teeth in crown and bridgework.

For purposes of description, reference made to denture covering primarily splints, bridgework, crowns and the like can be generally referred to and identified as a tooth engaging member, this member including the parallel projecting pins engaging the parallel holes drilled in the teeth by use of the instrument and through the separate steps of operations of the instrument in producing the desired end result.

It will be apparent that, in making a mold preparation for support of the assemblage carrier 16, the adaptation is always made on teeth other than those that are being worked on or under consideration. Therefore, in lateral setups, the support will be on the side opposite to the side on which are located the teeth being worked on. In bilateral operations, the mold support is made of any available teeth on the sides of the mouth, omitting any teeth which are being worked on. In connection with the foregoing, the same arrangements will be maintained in conducting the survey on the stone.

Having fully described my invention, what I claim as new and desire to secure by Letters Patent is:

1. In instruments for controlling the drilling of parallel holes in teeth of a jaw for proper support and positioning of a tooth engaging member on said jaw, a transit assemblage comprising a carrier having a primary control plate and an angularly disposed coupling plate, a link, one end of which is pivoted to said plates, an arm pivoted to the other end of said link, said arm being fixed to an elongated main pivot pin, said pivot pin being slidably and rotatably mounted in a widespread yoke, said yoke having an arm pivotally supporting, at its end, a secondary control plate parallel to said primary plate, all of said pivots being parallel and at right angles to said parallel primary and secondary plates, said primary and secondary plates being dovetailed in form and having bevelled side edges, the primary plate being adapted to engage a dovetailed socket of a support, the secondary plate engaging a dovetailed socket of a bracket, a contra-angle, and means adjustable on said bracket for coupling said contra-angle in rotatable and longitudinal adjusted positions.

2. An instrument as defined in claim 1, wherein the support for said carrier comprises a column on a base, and said first named socket being supported on the upper end of said column.

3. An instrument as defined in claim 1, wherein an adaptor plate is employed comprising a dovetailed plate and attached socket, the plate of said adaptor being adapted to engage the first named socket when the support therefor is a column arranged on a base, and said secondary plate being adapted to engage the socket of said adaptor in support of the transit assemblage on said column.

4. An instrument as defined in claim 3, wherein the primary plate of the carrier is adapted to support a socketed tray, including means supporting a tooth conforming mold in producing a supplemental support for said transit assemblage.

5. An instrument as defined in claim 1, wherein said socket of a support comprises part of a mold supporting tray detachably coupled with the primary plate of said carrier in support of the transit assemblage on a stone of the jaw of a mouth, as well as in the mouth of a patient.

6. An instrument as defined in claim 1, wherein said last named means comprises a clamp pivoted to the bracket in adjusting angularity of said contra-angle.

7. An instrument as defined in claim 2, wherein said contra-angle includes a chuck head, said base having a post, spaced with respect to said column, and said post having an alinement pin parallel to all of said pivots and adapted to receive said chuck head in adjustably retaining the axis of said chuck head in parallel relation to said pivots.

8. An instrument as defined in claim 1, wherein both plates of said carrier are formed to engage mold supporting trays in forming of said carrier a support for the transit assemblage on a stone of a jaw as well as on the jaw, of which said stone is a reproduction.

9. In instruments for controlling the drilling of parallel holes in teeth of a jaw for proper support and positioning of a tooth engaging member on said jaw, wherein a carrier is employed for support of a transit assemblage, including a contra-angle adjustably coupled with said assemblage, a transfer tray for detachable mounting on said carrier in forming a supplemental support for said assemblage, said tray comprising a dovetailed socket, a channel plate fixed to said socket, said plate being adapted to support a molded tooth conforming body, and means on said plate for anchorage of the molded body thereon.

10. A tray as defined in claim 9, wherein said means comprises formation in side walls of said channel plate.

References Cited
UNITED STATES PATENTS

| | | | |
|---|---|---|---|
| 2,318,403 | 5/1943 | Karlstrom | 32—67 |
| 3,152,401 | 10/1964 | Cowan | 32—67 |
| 3,226,828 | 1/1966 | Spalten | 32—67 |

FOREIGN PATENTS 495,953  6/1954  Italy.

LOUIS G. MANCENE, *Primary Examiner.*

N. RUSHEFSKY, *Assistant Examiner.*